United States Patent
Kroener et al.

(10) Patent No.: US 9,537,624 B2
(45) Date of Patent: Jan. 3, 2017

(54) FAST LOAD BALANCING BY COOPERATIVE SCHEDULING FOR HETEROGENEOUS NETWORKS WITH EICIC

(75) Inventors: Hans Kroener, Ulm (DE); Ioannis Maniatis, Unterensingen (DE)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/428,059

(22) PCT Filed: Sep. 13, 2012

(86) PCT No.: PCT/EP2012/067895
§ 371 (c)(1),
(2), (4) Date: Mar. 13, 2015

(87) PCT Pub. No.: WO2014/040623
PCT Pub. Date: Mar. 20, 2014

(65) Prior Publication Data
US 2015/0207596 A1   Jul. 23, 2015

(51) Int. Cl.
| | | |
|---|---|---|
| H04W 4/00 | (2009.01) | |
| H04L 5/00 | (2006.01) | |
| H04W 16/08 | (2009.01) | |
| H04W 72/04 | (2009.01) | |
| H04W 72/12 | (2009.01) | |
| H04W 16/32 | (2009.01) | |

(52) U.S. Cl.
CPC ............ *H04L 5/0032* (2013.01); *H04W 16/08* (2013.01); *H04W 72/0486* (2013.01); *H04W 72/1226* (2013.01); H04W 16/32 (2013.01)

(58) Field of Classification Search
CPC ............ H04L 5/0032; H04W 72/0486; H04W 72/1226; H04W 16/08; H04W 16/32
See application file for complete search history.

(56) References Cited

U.S. PATENT DOCUMENTS

| | | | |
|---|---|---|---|
| 2013/0044600 A1* | 2/2013 | Sridhar ................. | H04W 36/04 370/235 |
| 2013/0045740 A1* | 2/2013 | Gayde ................... | H04W 48/06 455/436 |
| 2013/0084865 A1* | 4/2013 | Agrawal ........... | H04W 36/0083 455/436 |
| 2013/0114434 A1* | 5/2013 | Muruganathan ...... | H04W 16/14 370/252 |

(Continued)

FOREIGN PATENT DOCUMENTS

| WO | WO 2012/044019 A2 | 4/2012 |
|---|---|---|
| WO | WO 2012/108640 A2 | 8/2012 |

*Primary Examiner* — Clemence Han
(74) *Attorney, Agent, or Firm* — Harrington & Smith

(57) ABSTRACT

Scheduling decisions between a first base station and a second base station are coordinated with respect to using subframes overlapping almost blank subframes for transmission, wherein the almost blank subframes include mandatory almost blank subframes which are predefined and are not to be used by the first base station and may be used by the second base station for transmission, and optional almost blank subframes which may be used by the first base station and the second base station. The almost blank subframes may be used for transmission according to the coordinated scheduling, and the transmission may be received by a user equipment.

22 Claims, 4 Drawing Sheets

(56) References Cited

U.S. PATENT DOCUMENTS

| | | | |
|---|---|---|---|
| 2013/0322235 A1* | 12/2013 | Khoryaev | H04W 24/10 370/229 |
| 2015/0016387 A1* | 1/2015 | Elmdahl | H04W 52/244 370/329 |
| 2015/0223135 A1* | 8/2015 | Ratasuk | H04W 16/32 455/436 |

* cited by examiner

FAST LOAD BALANCING BY COOPERATIVE SCHEDULING FOR HETEROGENEOUS NETWORKS WITH EICIC

FIELD OF THE INVENTION

The present invention relates to apparatuses, methods and a computer program product for fast load balancing in heterogeneous networks.

RELATED BACKGROUND ART

The following meanings for the abbreviations used in this specification apply:
ABS Almost Blank Sub-frame
BTS Base Transceiver Station
C-RAN Cloud Radio Access Network
CRS Cell specific Reference Signal
CSI Channel State Information
DL Downlink
eICIC enhanced Intercell Interference Coordination
GBR Guaranteed Bit Rate
LTE Long Term Evolution
MIB Master Information Block
OPEX OPerational EXpenditures
PCI Physical Cell Identifier
PDCCH Physical Downlink Control CHannel
PDSCH Physical Downlink Shared Channel
PRB Physical Resource Block
PSS Primary Synchronization Signal
QoS Quality of Service
RLM Radio Link Monitoring
RRM Radio Resource Management
RSRP Received Signal Received Power
RSRQ Received Signal Received Quality
SIB System Information Block
SSS Secondary Synchronization Signal
TTI Transmission Time Interval
UE User Equipment
UL Uplink
3GPP 3rd Generation Partnership Project Embodiments of the present invention relate to LTE and LTE-A radio access. In current LTE radio access networks there are two major trends for improving system capacity: namely, support of heterogeneous networks that are composed of macro, micro, pico and femto eNode Bs, and also centralized baseband processing where a large number of radio heads are connected to a central processing unit (also the terms C-RAN or baseband pooling/baseband hotelling refer to this kind of network deployments).

In the following, micro, pico and femto cells are referred to as small cells. Heterogeneous networks will deploy small radio cells/base stations in hot spot areas with high traffic demand like train stations, town centres, office areas etc in addition to the existing macro layer that provides the basic LTE coverage. The small cells might use the same or a different frequency layer. 3GPP has defined the so-called eICIC concept to enlarge the small cell coverage for those scenarios where both cells work on the same frequency layer. For this scheme a number of downlink sub-frames are not used by the macro base station and therefore the small cell base station will not be interfered in those sub-frames by the macro base station (some interference from reference symbols, synchronization symbols etc will remain and could be at least partly cancelled by the UE to enhance the performance). This allows the small cell base stations to serve in those sub-frames UEs that are located in the so-called cell range extension area that is just outside of the normal small cell coverage. This allows a better load balancing between the macro and small cells.

FIG. 1 illustrates the usage of the sub-frames in the macro and the small cells in the normal coverage and the small cell coverage. As shown, there are some subframes defined as ABS for the macro cell, and these subframes are preferably used for UE's in small cell range extension.

Another trend in future LTE network deployments concerns centralized baseband processing deployments where a number of different radio heads with different output power levels (serving macro/micro/pico or femto cells) are connected to a central baseband processing unit as shown in FIG. 2. In this example, the centralized baseband processing is carried out for a macro cell and also for small cells #1 to #3, which may be located in the geographical area of the macro cell.

Such schemes offer a number of advantages like
Centralized operation and maintenance saves OPEX
Baseband pooling gains
Simplified implementation of cooperative radio resource management schemes A basic problem of the above described eICIC scheme is that the macro cell will lose resources since DL transmissions are neither allowed on PDSCH nor on PDCCH. This leads to a loss of DL resources for the macro cell in proportion to the number of almost blank sub-frames. As a side effect there will be no dynamically scheduled uplink transmissions 4 sub-frames after a DL ABS since no PDCCH transmission were allowed during the ABS. Only semi-persistent UL scheduling allocations will be possible for those UL sub-frames.

Nevertheless, this scheme could still provide better system capacity and especially better cell edge throughputs since either those resources can be used by several small cells that are under the coverage of the considered macro cell or there are many users close to a small cell location in a so-called hot spot area. In both cases it is advantageous to reduce the capacity of the macro cell and boost the capacities of the small cells.

However, in real network deployments there will be a lot of different scenarios and the load of the macro and small cell layer will change dynamically due to mobility of the users and/or varying traffic demand.

Hence, the load has to be considered. In the following, some procedures regarding load collection and change of an ABS pattern according to the prior art are described.

3GPP has defined a number of procedures over the X2 interface that allow the exchange of load information as well as the negotiation of appropriate ABS patterns that will be employed by macro and small cells. Within the load information message two different information elements—the invoke information element and the ABS information element—have been defined to trigger (by small eNode B) and distribute ABS pattern information (by macro eNode B). Furthermore, within the resource status request/response messages the ABS status has been added to check the usage of the ABS in different radio cells which is a load measure for the ABS usage in the small cells.

Those procedures can be used to collect load information in the macro cell on the underlying small cells and decide on suitable ABS patterns and distribute the ABS information to the associated small cells. However, such layer 3 signalling requires some time and therefore ABS patterns can be changed in the range of a few minutes or so since the cell extension of the small cells needs to be adjusted also in response to the modified ABS pattern.

The adjustment of the cell range extension requires an estimation of how much spare capacity a certain neighbour cell has available. This can be checked via the composite available capacity information element that can be exchanged via the X2 interface as part of the resource status request/response/update procedures. Based on the collected load information it is possible to negotiate different values for the cell range extension via the mobility change procedure over the X2 interface. Finally these modified range extensions need to be converted to appropriate cell individual offset parameters that are then signalled to a subset or even all UEs in order to achieve the appropriate load balancing between the radio cells.

Thus, the described load adjustments by layer 3 signalling have the following drawbacks:
- Cannot be too fast since it is handled by radio layer 3 protocols
- Create a high signalling load if they are done too often
- Cannot track fast load changes
- Some definitions like the definition of composite available capacity are not so precise that a very good load balancing in a multi-vendor environment can be achieved.
- Use of a larger range extension does not directly mean that the load changes in the same way since that depends very much on the location of the UEs around the considered small cell.
- Cannot track the large load imbalances between different small cells
- Cannot track the high load variations in small cells that are caused by the relatively low number of UEs per small cell (typically there are only a few UEs per small cell)

SUMMARY OF THE INVENTION

Embodiments of the present invention address this situation and aim to overcome the above-described disadvantages and to provide fast load balancing.

This is achieved by the apparatuses and methods as defined in the appended claims. The invention may also be implemented by a computer program product.

According to an embodiment of the invention, scheduling decisions between a first base station and a second base station are coordinated with respect to using subframes overlapping almost blank subframes for transmission, wherein the almost blank subframes comprise mandatory almost blank subframes which are predefined and are not to be used by the first base station and may be used by the second base station for transmission, and optional almost blank subframes which may be used by the first base station and the second base station. The almost blank subframes may be used for transmission according to the coordinated scheduling, and the transmission may be received by a user equipment.

Thus, according to embodiments of the present invention, fast load balancing can be achieved.

BRIEF DESCRIPTION OF THE DRAWINGS

These and other objects, features, details and advantages will become more fully apparent from the following detailed description of embodiments of the present invention which is to be taken in conjunction with the appended drawings, in which.

DETAILED DESCRIPTION OF EMBODIMENTS

In the following, description will be made to embodiments of the present invention. It is to be understood, however, that the description is given by way of example only, and that the described embodiments are by no means to be understood as limiting the present invention thereto.

Before explaining embodiments in detail, in the following it is again referred to the problem underlying the present application. As mentioned above, in present network deployments there will be a lot of different scenarios so that the load of the macro and small cell layer will change dynamically due to mobility of the users, varying traffic demand and the like.

This means that the number of the almost blank subframes as well as the range extension used in the different small cells need to be changed dynamically in response to the load changes in order to optimize the resource utilization and provide the best service to the end user.

Hence, according to embodiments of the present invention, a fast load balancing is provided by dynamic allocation of almost blank subframes.

It is noted that an almost blank subframe (ABS) is defined in this context as a subframe in which basically no transmission or transmission with reduced transmission power takes place and control signaling is allowed with normal transmission power which is necessary to provide backward compatibility. That is, on an almost blank subframe no PDSCH and no PDCCH are transmitted, but transmission of, e.g., cell-specific RSs (CRS), CSI-RS, PSS, SSS, SIB, MIB and the like is allowed.

Figure 3:
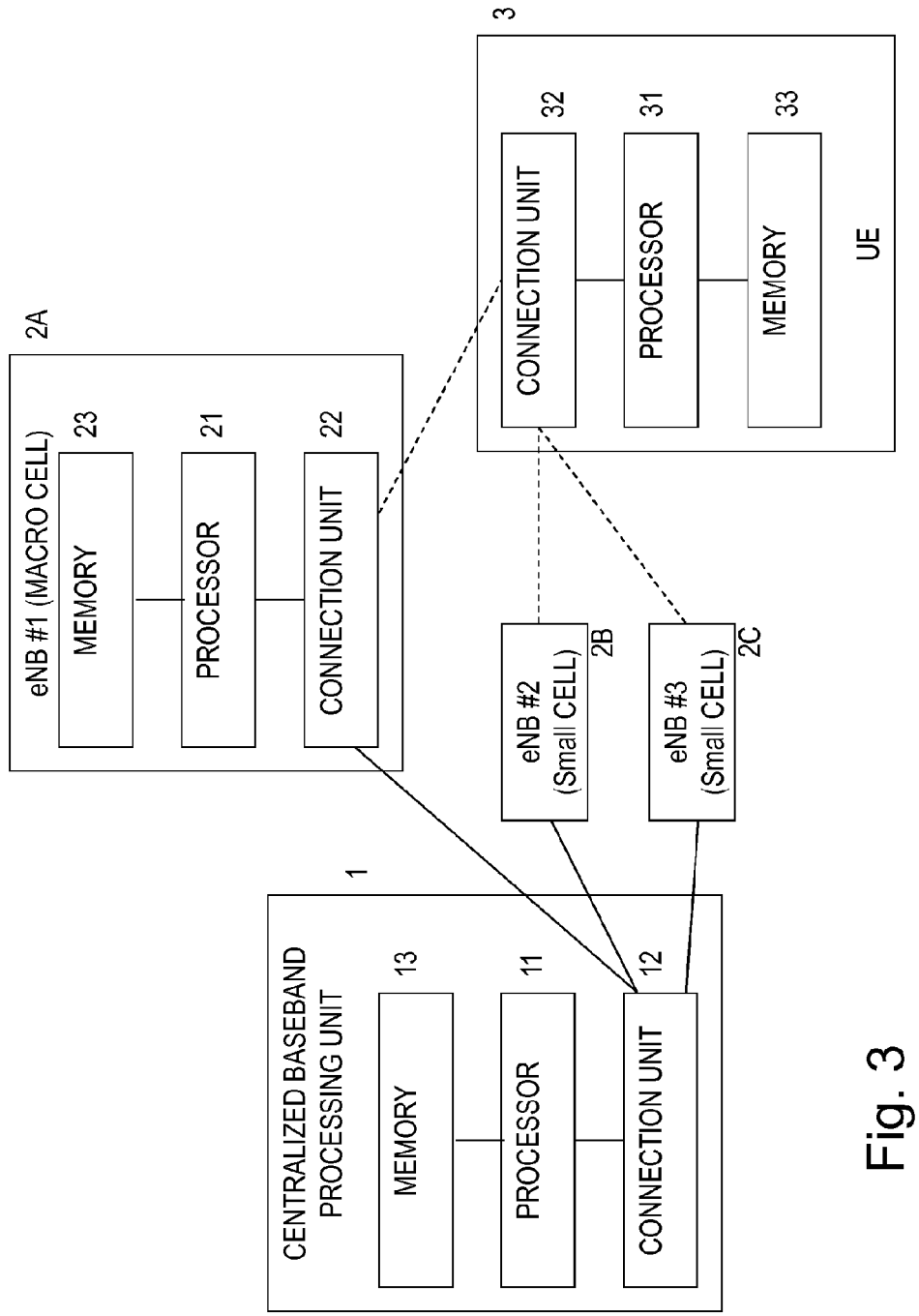
FIG. 3 shows basic examples for a scheduler, eNBs and a UE according to embodiments of the present invention.

FIG. 3 illustrates some elements according to more general embodiments of the present invention.

In detail, FIG. 3 shows a centralized baseband processing unit 1 as an example for a network control element or a corresponding apparatus according to a general embodiment of the present invention. The apparatus may be the network control element or the centralized baseband processing unit, or only a part thereof, for example. The centralized baseband processing unit 1 comprises a processor 11 and a connection unit 12. The connection unit 12 is configured to provide connection to at least a first base station (e.g., eNB #1 denoted by 2A) and at least a second base station (e.g., eNB #2 and/or eNB #3 denoted by 2B and 2C) in a network. The processor 11 is configured to coordinate scheduling decisions between the first base station and the second base station with respect to using subframes overlapping almost blank subframes for transmission, wherein the almost blank subframes comprise mandatory almost blank subframes which are predefined and are not to be used by the at least first base station and may be used by the at least second base station for transmission, and optional almost blank subframes which may be used by the at least first base station and the at least second base station.

It is noted that a centralized approach is no prerequisite for the idea underlying the present invention. Different schedulers may be located in different BTSs and those schedulers may exchange some fast load information.

Using subframes overlapping almost blank subframes for transmission means that one base station may use those subframes which are indicated as almost blank subframes for another base station.

Optionally, the centralized baseband processing unit may also comprise a memory 13 for storing data and programs, by means of which the processor 11 may carry out its corresponding functions.

Furthermore, FIG. 3 shows eNBs #1 to #3 (denoted by 2A, 2B and 2C) as an example for a base station or a corresponding apparatus according to a general embodiment of the present invention. The apparatus may be the base station or only a part thereof, for example. The structure of the eNBs 2A to 2C can be basically the same, so that in the following only the structure of eNB 2A is described. In detail, the eNB 2A comprises a processor 21 and a connection unit 22. The connection unit 22 is configured to provide connection to a network control element, such as the centralized baseband processing unit 1, for example. The processor 21 is configured to coordinate scheduling with respect to using subframes overlapping almost blank subframes for transmission with the network control element, wherein the almost blank subframes comprise mandatory almost blank subframes which are predefined and are not to be used by at least first base station and may be used by at least a second base station for transmission, and optional almost blank subframes which may be used by the at least first base station and the at least second base station for transmission, and to use the almost blank subframes for transmission according to the coordinated scheduling.

Similar as described above in connection with the centralized baseband processing unit 1, also the eNB may comprise a memory 23 for storing data and programs, by means of which the processor 21 may carry out its corresponding functions.

The eNB may be the at least first base station, which is configured to serve a macro cell, or, alternatively, may be the at least second base station, which is configured to serve a small cell. In this example of FIG. 3, it is assumed that eNB #1 (denoted by 2A) serves a macro cell, i.e., is the first base stations, whereas eNBs #2 and #3 (denoted by 2B and 2C) both serve small cells, i.e., are second base stations.

Moreover, FIG. 3 also shows a UE 3 as an example for a corresponding apparatus according to a general embodiment of the present invention.

The UE 3 comprises a connection unit 32 configured to provide connection to at least a first base station (e.g., eNB #1) and/or at least a second base station (e.g., eNB #2 and/or eNB #3) in a network. The processor 31 is configured to receive transmission on subframes overlapping almost blank subframes for transmission, wherein the almost blank subframes comprise mandatory almost blank subframes which may be are predefined and not to be used by the at least first base station and may be used by the at least second base station for transmission, and optional almost blank subframes which may be used by the at least first base station and the at least second base station.

Optionally, also the UE 3 may comprise a memory 33 for storing data and programs, by means of which the processor 31 may carry out its corresponding functions.

Moreover, the processor 31 may be configured to receive configuration information by which the processor is caused to carry out measurements on the mandatory almost blank subframes or a subset of the mandatory almost blank subframes.

It is noted that in FIG. 3, wireless connections of the UE 3 with the corresponding eNBs are indicated by dashed lines, whereas the connections between the eNBs and the centralized processing unit 1 are indicated by solid lines. Optionally, the eNBs 2A to 2C may be interconnected via X2 interfaces (not shown in FIG. 3).

Figure 1:
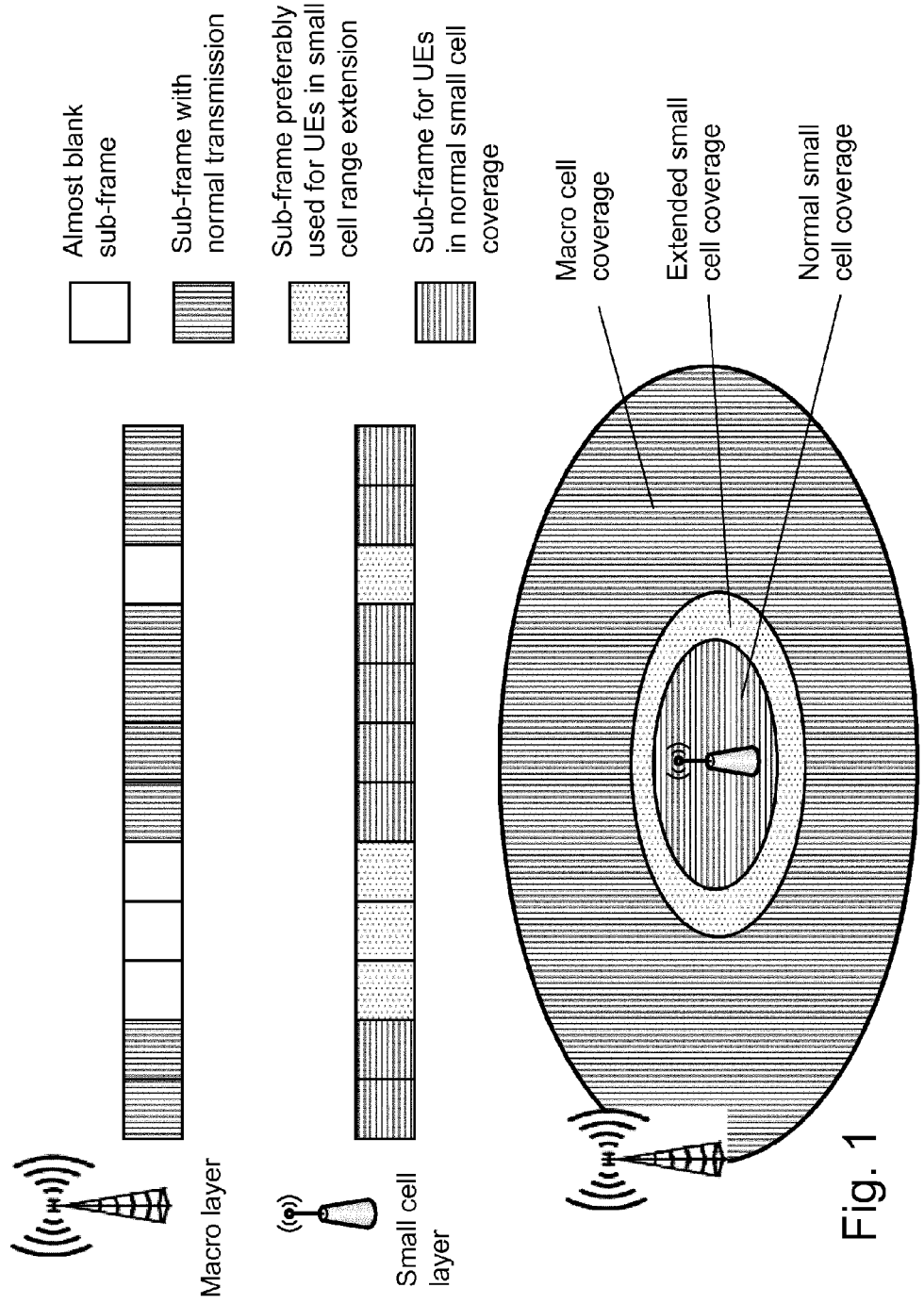
FIG. 1 illustrates the principle of eICIC.
Figure 2:
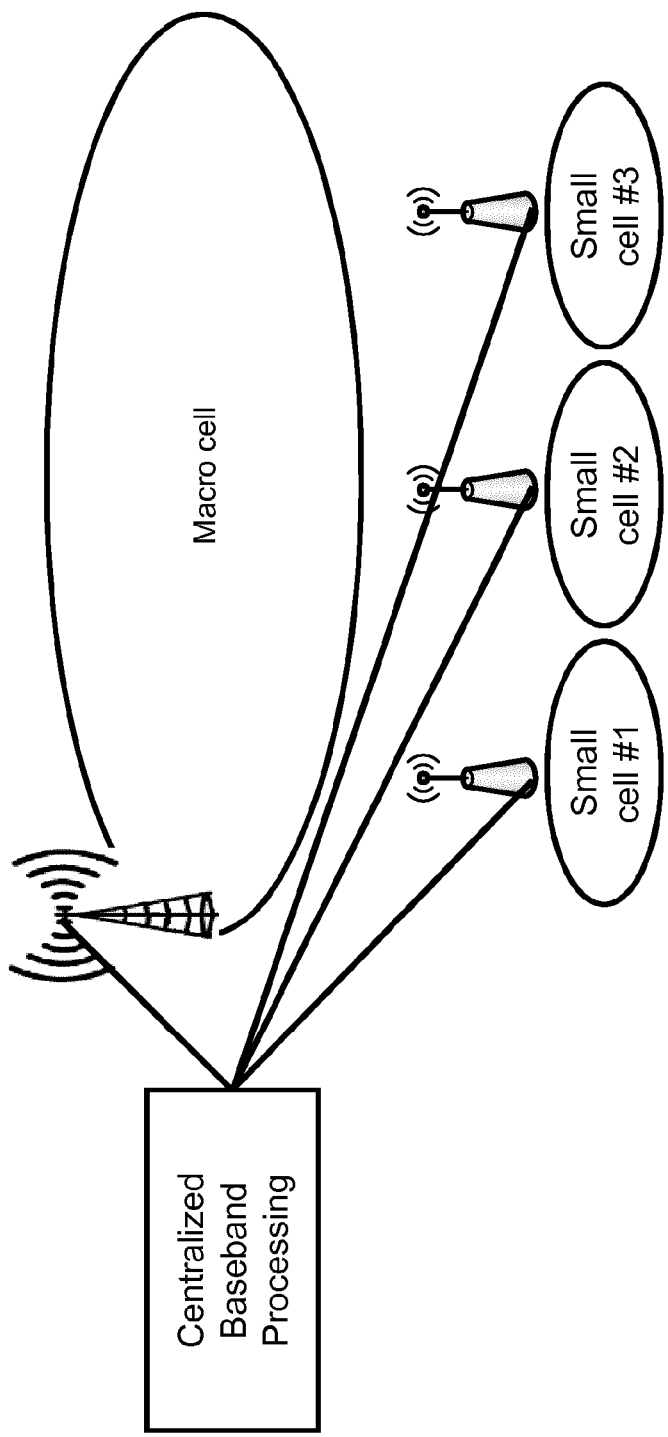
FIG. 2 illustrates centralized baseband processing in heterogeneous networks.

Hence, according to some embodiments of the present invention, a fast scheduler based load balancing, that makes use of a centralized baseband processing architecture shown in FIG. 2, is added to the existing load balancing framework from 3GPP. The centralized baseband processing unit is connected to at least one macro cell (e.g., eNB #1) and the associated small cells (e.g., eNB #2 and eNB #3) that share the same geographic area as the macro cell (without loss of generality a bigger baseband processing unit can be used that serves several macro cells and the associated small cells). This kind of architecture allows coordinated scheduling decisions between different radio cells and is used according to embodiments of the present invention to achieve a fast load balancing between macro and small cells.

The fast load balancing concept classifies the almost blank sub-frames into two different categories:

1. Mandatory almost blank sub-frames
2. Optional almost blank sub-frames

Mandatory almost blank sub-frames cannot be used by the macro cell at all, whereas optional almost blank sub-frames might be used by the macro cell depending on the load situation in the macro cell and the overlapping small cells. So basically the scheduling decision will be taken such that the schedulers (in the macro cell and the small cells, respectively) are coordinated such that they jointly decide whether the ABS shall be used by the macro cell (offering higher capacity to the macro cell) or whether the ABS shall be kept free (offering higher capacity to the small cells for range extension UEs). This decision might aim at improving system capacity, improving cell edge throughput, improving quality of service and so on.

In addition the UE measurements should preferably be configured such that all measurements that should be done for the almost blank sub-frames are restricted to the mandatory almost blank sub-frames only (or even to a subset of the mandatory almost blank sub-frames). Also all measurements that should be done for normal sub-frames should be restricted to normal sub-frames only and should not cover any optional ABS. This should be done since for the optional ABS the UE would not know whether those are used sub-frames or almost blank sub-frames. This restriction will be applied to the following UE measurements:

CSI reporting (CSI=Channel State Information)
Radio link monitoring
Radio Resource Management measurements (in particular Received Signal Received Quality, RSRQ)

In the following, implementation examples according to some embodiments of the present invention are described.

Figure 4:
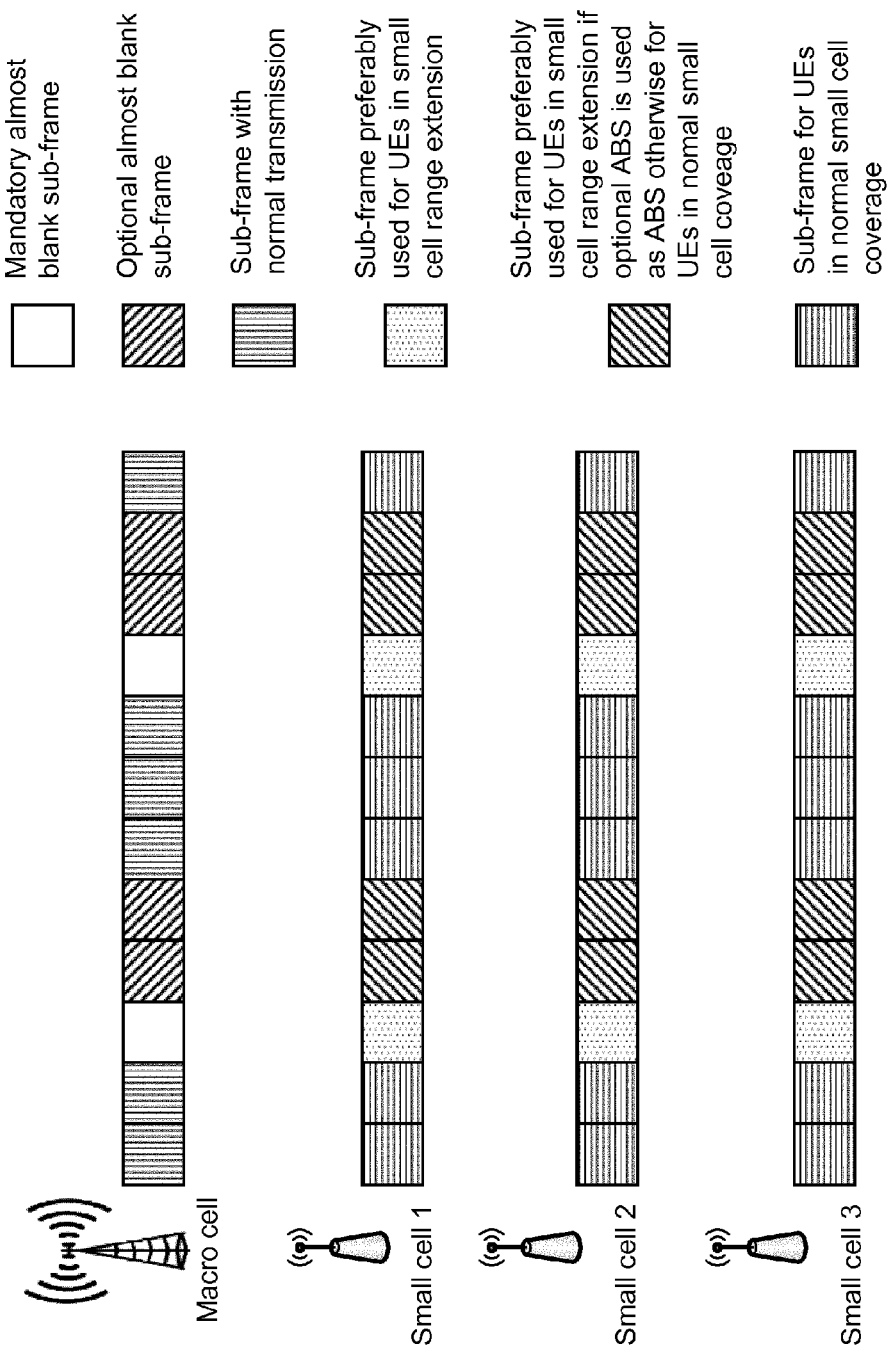
FIG. 4 illustrates the allocation of sub-frames in the macro and in the small cells according to an embodiment of the present invention.

FIG. 4 illustrates the allocation of sub-frames in a macro cell and in small cells 1 to 3 according to an embodiment of the present invention.

Thus, in the macro cells the following subframes can be distinguished:

Mandatory ABS
Optional ABS (can be either used as ABS or as normal sub-frame)
Normal sub-frames The small cells should use the sub-frames that overlap with a mandatory ABS or an optional ABS that is maintained as an ABS as much as possible for the UEs that are located in the range extension area, since in those sub-frames there is no macro cell interference (only if those cannot be filled by the UEs in the range extension the UEs in the normal small cell coverage might compete for the remaining resources). On the other hand, the normal sub-frames as well as the optional sub-frames which are used as normal sub-frames can be only used for UEs in the normal small cell coverage. This is the basic method how the coordinated schedulers need to do the resource allocation.

In the following, some embodiments for more detailed scheduler concepts are described.

Basically the scheduler coordination could work as follows for a forthcoming optional ABS:

Step 1: Small cell schedulers (e.g., schedulers located in the eNBs of the small cells) need to assess how much this optional ABS could be filled with traffic from UEs that are located in the cell range extension of the associated small cell. The load can be defined as the percentage of the PRBs that can be filled with traffic from UEs in the range extension (note that this can be more than 100%).

Step 2: Macro cell scheduler (e.g., scheduler located in the eNB of the macro cell) needs to assess how much this optional ABS could be filled with traffic from UEs that are served in the macro cell. The load can be defined as the percentage of the PRBs that can be filled with traffic from macro UEs (not this can be 100%).

Step 3: Based on these load measurements, it can be decided whether there is more load in the macro or in the small cells for range extension UEs. If there is more load in the macro cell then the optional ABS shall be used as normal sub-frame to reduce the load in the macro cell whereas in the other case the optional ABS needs to be an ABS to reduce the load of the range extension UEs in the small cell.

Some enhancements/variations of this scheduling concept are the following:

Load might be defined as total load considering all types of traffic irrespectively of its QoS class or it might be defined as load of guaranteed bit rate (GBR) traffic or there might be two different load values for GBR and non-GBR traffic.

The load values might be scaled with the resources that were available for a certain time interval (e.g. during the last 40 sub-frames). In that case the load will be scaled to the number of normal sub-frames (for the macro cell load) and to the number of ABS (for the load of the range extension UEs in the small cells)

The load in the macro cell might be compared to the average load of the small cells or to the peak load of all involved small cells.

The concept described above also has an influence on UE measurement configuration, as will be described in the following.

Namely, 3GPP Rel. 10 has introduced measurement restrictions for RRM/RLM/CSI measurements to enable proper measurements for RRM (especially handover), check radio link quality and get differentiated feedback for ABS and normal sub-frames. Basically the following measurement restrictions have been defined:

Serving cell RRM/RLM measurement restrictions:
one measurement pattern for RLM/RRM measurements on the serving cell Neighbor cell RRM measurement restrictions:
one measurement pattern for neighboring cell RRM measurements CSI measurement restrictions:
will have separate signaling for two measurement patterns relevant for CSI One example how the measurement patterns can be configured is like this:
Macro cell own RRM/RLM measurements during normal sub-frames (alternatively this could be also for all sub-frames)
Macro cell neighbour RRM measurements to small cell during ABS
Small cell own RRM/RLM measurements during ABS
Small cell neighbour RRM measurements to macro during normal sub-frames (alternatively this could be also for all sub-frames)
Macro cell CSI measurements during normal sub-frames
Small cell CSI measurements separate for ABS and normal sub-frames These measurements should be revised with the proposed measures according to some embodiments of the present invention such that all measurements that should be taken for ABS in the normal eICIC concept should be further restricted to mandatory ABS for the proposed scheme. In the example above this will result in
Macro cell own RRM/RLM measurements during normal sub-frames (alternatively this could be also for all sub-frames)
Macro cell neighbour RRM measurements to small cell during mandatory ABS
Small cell own RRM/RLM measurements during mandatory ABS
Small cell neighbour RRM measurements to macro during normal sub-frames (alternatively this could be also for all sub-frames)
Macro cell CSI measurements during normal sub-frames
Small cell CSI measurements separate for mandatory ABS and normal sub-frames, no CSI measurement for optional ABS The basic rule that ABS should be replaced by mandatory ABS can be applied also for different settings as the one defined above.

The proposed scheme according to embodiments of the present invention allows a fast load balancing between macro and small cells on a per TTI basis. This provides the following advantages:
A significantly improved DL system capacity can be achieved due to fast load adaptation capability.
An improved UL system capacity with dynamic scheduling (due to efficient use of DL PDCCH resources) can be achieved.
The proposed scheme can cope with large traffic variations between macro and small cell layer.
The proposed scheme cope with fast traffic variations that occur primarily in the small cells due to a low number of users, change of number of users in the range extension and very unequal load of different small cells.
The proposed scheme could cover a large range of load situations when the number of mandatory ABS and normal ABSs is small compared to the number of optional ABSs.
Mandatory ABSs can be assigned network wide whereas optional ABS might be assigned differently in different areas of the network It is noted that the embodiments and the present invention in general is not limited to the specific examples given above.

For example, ABSs can be also used in small cells in order to protect the traffic of fast moving UEs that remain connected to the macro cell when they pass the small cell at a low distance and would receive too much interference from the small cell. Also for those it might be helpful to define mandatory and optional ABS since those fast moving UEs would required a very sporadic support of small ABS and therefore a permanent allocation of ABS for the small BTS is very inefficient.

Instead of using coordinated schedulers there could also be one big scheduler that serves the macro cell and all related small cells. That is, instead of providing schedulers in the corresponding eNBs of the macro cell and the small cell, the scheduler function can be incorporated into the centralized baseband processing unit, for example.

It might be also possible to introduce some additional signalling via the X2 interface to do the necessary scheduler coordination. If that is done, then the decision cannot be done on a per sub-frame basis but needs to be done for several sub-frames in advance due to the involved signalling delays. This method needs to be standardized and has a lower performance than the scheme that relies on centralized baseband processing.

According to an aspect of the invention, an apparatus, e.g. the centralized baseband processing unit 1, comprises means for coordinating scheduling decisions between a first base station and a second base station with respect to using subframes overlapping almost blank subframes for transmission, wherein the almost blank subframes comprise mandatory almost blank subframes which are predefined and are not to be used by the first base station and may be used by the second base station for transmission, and optional almost blank subframes which may be used by the first base station and the second base station.

The first base station may serve a macro cell and the second base station may serve a small cell within the same geographical area as the macro cell.

The means for scheduling may coordinate scheduling based on the load of the first base station and the load of the second base station.

The means for scheduling may coordinate scheduling such that the optional almost blank subframes may be used for transmission by the base station of which has a highest load among the first and second base stations.

Load of the first base station may be defined as a percentage of physical resource blocks which can be filled with traffic from user equipments served by the first base station, and load of the second base station may be defined by a percentage of the physical resource blocks which can be filled with traffic from user equipments which are served by the second base station and, optionally, which are located in a cell range extension area of the small cell.

The load may be defined by taking into account quality of service.

The load may be scaled with the resources which were available in a certain time interval.

The load of the first base station may be compared to an average load of the second base station or a peak load of the second base station.

The load may comprise at least one of a GBR load, a non-GBR load and voice load.

The apparatus may comprise means for performing the scheduling for the first base station and the second base station.

The means for coordinating scheduling may coordinate scheduling or the means for performing scheduling may perform scheduling for each of first base stations and second base stations located in the geographical area of each first base station.

The apparatus and/or the first and second base stations may comprise an eNodeB.

The means for coordinating scheduling and the means for performing scheduling may be implemented by the memory 13, the processor 11 and the connecting unit 12.

According to an aspect of the invention, an apparatus, e.g. the eNB#1 2A, comprises means for coordinating scheduling with respect to using subframes overlapping almost blank subframes for transmission with a network control element, wherein the almost blank subframes comprise mandatory almost blank subframes which are predefined and are not to be used by at least a first base station and may be used by at least a second base station for transmission, and optional almost blank subframes which may be used by the at least first base station and the at least second base station for transmission, and means for using the almost blank subframes for transmission according to the coordinated scheduling.

The apparatus may be the at least first base station or may be part of the at least first base station configured to serve a macro cell.

Alternatively, the apparatus may be the at least second base station or may be part of the at least second base station configured to serve a small cell.

The means for using the almost blank subframes for transmission may use the mandatory almost blank subframes and/or optional almost blank subframes for transmission with user equipments located in a cell range extension area of the small cell.

The apparatus may comprise means for configuring a user equipment to perform measurements on the mandatory blank subframes or a subset of the mandatory blank subframes only.

The apparatus and/or the first and second base stations may comprise an eNodeB.

The means for coordinating, using and configuring may be implemented by the memory 23, the processor 21 and the connecting unit 22.

According to an aspect of the invention, an apparatus, e.g. the UE 3, comprises means for receiving transmission on subframes overlapping almost blank subframes for transmission, wherein the almost blank subframes comprise mandatory almost blank subframes which are predefined and are not to be used by an at least first base station and may be used by an at least second base station for transmission, and optional almost blank subframes which may be used by the at least first base station and the at least second base station.

The means for receiving may receive configuration information by which means for measuring of the apparatus may be caused to carry out measurements on the mandatory almost blank subframes or a subset of the mandatory almost blank subframes.

The means for receiving and measuring may be implemented by the memory 33, the processor 31 and the connecting unit 32.

It is to be understood that any of the above modifications can be applied singly or in combination to the respective aspects and/or embodiments to which they refer, unless they are explicitly stated as excluding alternatives.

For the purpose of the present invention as described herein above, it should be noted that an access technology via which signaling is transferred to and from a network element may be any technology by means of which a network element or sensor node can access another network element or node (e.g. via a base station or generally an access node). Any present or future technology, such as WLAN (Wireless Local Access Network), WiMAX (Worldwide Interoperability for Microwave Access), LTE, LTE-A, Bluetooth, Infrared, and the like may be used; although the above technologies are mostly wireless access technologies, e.g. in different radio spectra, access technology in the sense of the present invention implies also wired technologies, e.g. IP based access technologies like cable networks or fixed lines but also circuit switched access technologies; access technologies may be distinguishable in at least two categories or access domains such as packet switched and circuit switched, but the existence of more than two access domains does not impede the invention being applied thereto, usable communication networks, stations and transmission nodes may be or comprise any device, apparatus, unit or means by which a station, entity or other user equipment may connect to and/or utilize services offered by the access network; such services include, among others, data and/or (audio-) visual communication, data download etc.;

a user equipment or communication network element (station) may be any device, apparatus, unit or means by which a system user or subscriber may experience services from an access network, such as a mobile phone or smart phone, a personal digital assistant PDA, or computer, or a device having a corresponding functionality, such as a modem chipset, a chip, a module etc., which can also be part of a UE or attached as a separate element to a UE, or the like;

method steps likely to be implemented as software code portions and being run using a processor at a network element or terminal (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above, eNode-B etc. as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined apparatuses, or any one of their respective means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

It is noted that the embodiments and examples described above are provided for illustrative purposes only and are in no way intended that the present invention is restricted thereto. Rather, it is the intention that all variations and modifications be included which fall within the spirit and scope of the appended claims.

The invention claimed is:
1. An apparatus comprising
a memory storing a program;
a processor,
the memory and the program configured, with the processor, to cause the apparatus to perform at least the following:
coordinate scheduling decisions for a given transmission time interval (TTI) between at least a first base station and at least a second base station with respect to using subframes overlapping almost blank subframes for transmission, wherein the almost blank subframes comprise mandatory almost blank subframes in the TTI which are predefined and optional almost blank subframes in the TTI;
wherein the scheduling decisions for the TTI are restricted such that:
subframes overlapping the mandatory almost blank subframes are not to be used by the at least first base station and may be used by the at least second base station for transmission, and
subframes overlapping the optional almost blank subframes may be used by the at least first base station and the at least second base station.

2. The apparatus according to claim 1, wherein the memory and the program are further configured, with the processor, to cause the apparatus to perform at least the following: coordinate the scheduling decisions per TTI based on load of the first base station and load of the second base station.

3. The apparatus according to claim 2, wherein the memory and the program are further configured, with the processor, to cause the apparatus to perform at least the following: coordinate the scheduling decisions per TTI such that the subframes overlapping the optional almost blank subframes are usable for transmission by whichever base station has a highest load among the first and second base stations.

4. The apparatus according to claim 2, wherein load of the first base station is defined as a percentage of physical resource blocks which can be filled with traffic from user equipments served by the first base station, and load of the second base station is defined by a percentage of the physical resource blocks which can be filled with traffic from user equipments which are served by the second base station.

5. The apparatus according to claim 2, wherein the load is defined by taking into account quality of service.

6. The apparatus according to claim 2, wherein the load is scaled with the resources which were available in a certain time interval.

7. The apparatus according to claim 2, wherein the load of the first base station is compared to an average load of the second base station or a peak load of the second base station.

8. The apparatus according to claim 2, the load comprising at least one of a guaranteed bit rate (GBR) load, a non-GBR load and a voice load.

9. The apparatus according to claim 1, wherein the memory and the program are further configured, with the processor, to cause the apparatus to perform at least the following: perform scheduling for the first base station and the second base station, according to the coordinated scheduling decisions for the given TTI.

10. The apparatus according to claim 1, wherein the memory and the program are further configured, with the processor, to cause the apparatus to perform at least the following: provide a connection to a plurality of first base stations, and coordinate the scheduling decisions and perform scheduling for each of the at least first base station and each of the at least second base station located in a geographical area of each of the at least first base station.

11. The apparatus according to claim 1, wherein the memory and the program are further configured, with the processor, to cause the apparatus to perform at least the following: use the almost blank subframes for transmission according to the coordinated scheduling decisions.

12. The apparatus according to claim 1, wherein the apparatus is or is part of the at least first base station configured to serve a macro cell, the apparatus is or is part of the at least second base station configured to serve a small cell, or the apparatus provides connection to the at least first base station and to the at least second base station in a network.

13. A method comprising:
coordinating scheduling decisions for a given transmission time interval (TTI) between at least a first base station and at least a second base station with respect to using subframes overlapping almost blank subframes for transmission, wherein the almost blank subframes comprise mandatory almost blank subframes in the TTI which are predefined and optional almost blank subframes in the TTI;
wherein the scheduling decisions for the TTI are restricted such that:
subframes overlapping the mandatory almost blank subframes are not to be used by the at least first base station and may be used by the at least second base station for transmission, and
subframes overlapping the optional almost blank subframes may be used by the at least first base station and the at least second base station.

14. The method according to claim 13, comprising:
coordinating the scheduling decisions per TTI based on load of the first base station and load of the second base station.

15. The method according to claim 14, comprising:
coordinating the scheduling decisions per TTI such that the subframes overlapping the optional almost blank subframes are usable for transmission by whichever base station of has a highest load among the first and second base stations.

16. The method according to claim 14, wherein load of the first base station is defined as a percentage of physical resource blocks which can be filled with traffic from user equipments served by the first base station, and load of the second base station is defined by a percentage of the physical resource blocks which can be filled with traffic from user equipments which are served by the second base station.

17. The method according to claim 14, wherein the load is defined by taking into account quality of service.

18. The method according to claim 14, wherein the load is scaled with the resources which were available in a certain time interval.

19. The method according to claim 14, wherein the load of the first base station is compared to an average load of the second base station or a peak load of the second base station.

20. The method according to claim 13, comprising:
performing scheduling for the first base station and the second base station for the given TTI according to the coordinated scheduling decisions.

21. The method according to claim 13, comprising:
providing a connection to a plurality of first base stations, and
coordinating the scheduling decisions and performing scheduling for each of the at least first base station and each of the at least second base station located in a geographical area of each of the at least first base station.

22. A non-transitory computer-readable memory storing one or more programs which, when run on a processor, cause the processor to at least:
coordinate scheduling decisions for a given transmission time interval (TTI) between at least a first base station and at least a second base station with respect to using subframes overlapping almost blank subframes for transmission, wherein the almost blank subframes comprise mandatory almost blank subframes in the TTI which are predefined and optional almost blank subframes in the TTI;
wherein the scheduling decisions for the TTI are restricted such that:
subframes overlapping the mandatory almost blank subframes are not to be used by the at least first base station and may be used by the at least second base station for transmission, and
subframes overlapping the optional almost blank subframes may be used by the at least first base station and by the at least second base station.

* * * * *